Oct. 5, 1965
R. A. KOBLE
3,210,151
RECOVERY OF URANIUM AND VANADIUM
Filed July 20, 1961
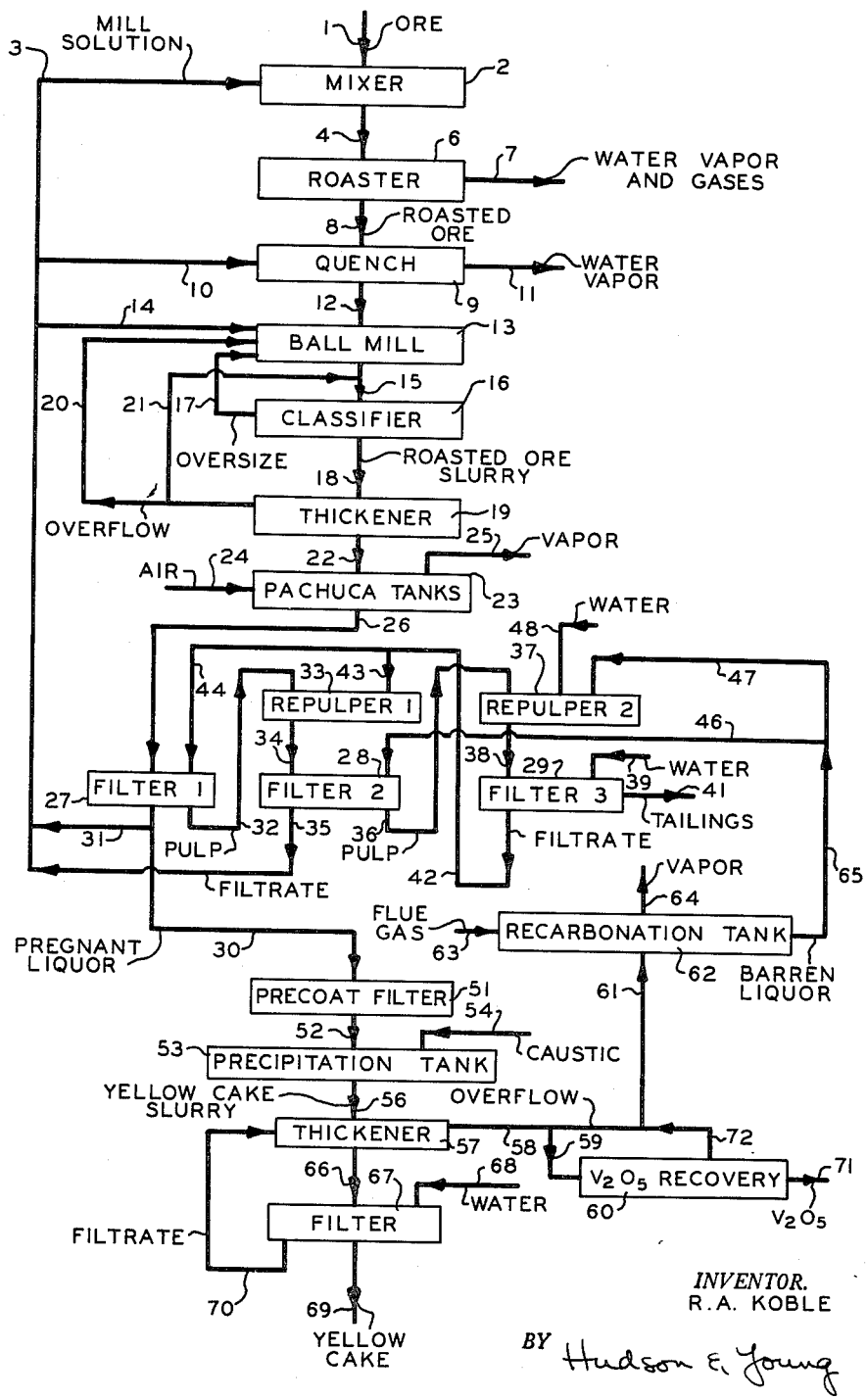
INVENTOR.
R.A. KOBLE
BY Hudson E. Young
ATTORNEYS

United States Patent Office 3,210,151
Patented Oct. 5, 1965

3,210,151
RECOVERY OF URANIUM AND VANADIUM
Robert A. Koble, Bartlesville, Okla., assignor to Phillips Petroleum Company, a corporation of Delaware
Filed July 20, 1961, Ser. No. 125,417
3 Claims. (Cl. 23—14.5)

This invention relates to the recovery of uranium and vanadium from ores bearing the same, such as coffinite, by the carbonate leaching process. In another aspect, it relates to a method for improving the extraction of uranium from ores containing the same together with vanadium.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content.

The carbonate leaching process for extracting uranium values from the uranium-bearing materials comprises contacting ground uranium-bearing ore with hot aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a series of alternate filtering, washing, and repulping steps. The leached pulp is discarded as tailings. If the washing operation isn't efficient, small but economically significant amounts of soluble uranium values (and, where present, soluble vanadium values) remain occluded in the tailings and are discarded therewith. Inefficient washing of the leached pulp also may result in the loss of significant amounts of active sodium ion values. While the washing operation in some commercial plants is generally satisfactory, there still remains a need for a means of increasing the efficiency of this operation to prevent such losses of valuable materials.

Other materials and non-metals are commonly associated with uranium-bearing ore. The principal metal commonly associated with uranium-bearing ore is vanadium. Some of the vanadium is commonly extracted with the uranium values in the carbonate leaching step as soluble vanadates. For example, a typical secondary uranium ore such as coffinite will contain about 0.25% $U_3O_8$ and 0.1% $V_2O_5$, but during the leaching step only about 10 to 15% of the $V_2O_5$ present in the ore will be extracted. Thus, there has arisen a need for a means of increasing in an economical manner the extraction and subsequent recovery of $V_2O_5$ from such ores.

Accordingly, an object of this invention is to improve the recovery of uranium and vanadium from ores bearing the same. Another object is to provide an improved method for extracting vanadium values from ores containing the same and uranium values. Another object is to improve the washing of leached pulp produced according to the carbonate leaching process. Another object is to improve the extraction of vanadium values from vanadium-bearing ores. Other objects and advantages of this invention will become apparent to those skilled in the art from the following discussion, appended claims, and accompanying drawing in which the sole figure is a flow sheet schematically illustrating the improved process of this invention.

In its broader aspects, I have discovered that by initially roasting uranium- and vanadium-bearing ore in the presence of an aqueous alkaline mill solution containing dissolved sodium salt, such as sodium carbonate and sodium bicarbonate, the extraction of vanadium values from such ore as soluble vanadates is materially increased. Further, that by reason of such roasting operation and the attendant vaporization of water from the mill solution, a greater amount of water can be employed in the subsequent washing of the leached pulp, thereby reducing the loss of valuable amounts of soluble uranium and vanadium values, as well as active sodium ion values.

Referring now to the drawing, there is illustrated the improved vanadium extraction feature of this invention in conjunction with a carbonate leaching process. Fine uranium- and vanadium-bearing ore, prepared by crushing, grinding, and classifying such ore, is passed via line 1 to a suitable mixer 2 where it is contacted with aqueous alkaline mill solution containing dissolved sodium salt supplied via line 3. Mixer 2 can consist of merely a moving belt carrying fine ore onto which is sprayed the mill solution. Although not essential to this invention, dry sodium salt, such as sodium chloride, sodium carbonate, or sodium bicarbonate, can be added to the mixer to supplement that sodium salt dissolved in the mill solution. Use of the mill solution provides an intimate contact not achieved by contacting the ore with sodium salt solely in its dry state. The fine ore wetted with mill solution is passed from mixer 2 via line 4 to a roaster or furnace 6 where the wetted ore is heated at elevated temperatures to solubilize a significant amount of the vanadium values present in the ore. Roaster 6 can be any type of furnace which will provide suitable operating temperatures and suitable residence time. For example, it can consist of a plurality of superimposed hearths having a vertical shaft passing through the hearths with rabble arms attached to the shaft for effecting intimate contact of the ore with combustion gases and effecting transportation of the ore from one hearth to the other, a suitable commercial furnace of this type being known in the art as a Skinner roaster supplied by the Colorado Foundry and Iron Works. The furnace will generally be operated at a temperature from 1200 to 1700° F. preferably 1500 to 1600° F., with a residence time at operating temperatures of about 45 minutes to about one hour. During the roasting operation a significant amount of water (from the mill solution) is evaporated; for example, 0.44 ton of water can be evaporated for each ton of ore. The removal of this water from the system will significantly aid in the subsequent washing of the leached pulp, as will be explained later. Water vapor and furnace combustion gases are withdrawn from furnace 6 via line 7, together with some ore dust.

The hot roasted ore, containing the solubilized vanadium values, is withdrawn from roaster 6 via line 8 and quickly passed to a quench tank 9 where it is cooled and quenched upon contact with further mill solution supplied via line 10. Water vapor evolved by this quench operation is removed from quench tank 9 via line 11. The cooled and quenched ore is then passed via line 12 to ball mill 13 or the like where it is ground, preferably in the presence of further mill solution supplied via line 14. The resulting slurry of ground roasted ore and mill solution is passed via line 15 to classifier 16 or the like, where oversize material is separated and recycled via line 17 to ball mill 13. The remaining fine ore slurry is passed via line 18 to thickener 19. Some overflow from thickener 19 is recycled via line 20 to ball mill 13, and some recycled via line 21 to slurry line 15. The underflow from thickener 19 is passed via line 22 to one or more Pachuca tanks 23 wherein the ore is leached at elevated temperatures to solubilize the uranium values. The slurry in Pachuca tanks 23 is contacted with oxygen by passing air therethrough via line 24 and the slurry is maintained under a pressure in the range of atmospheric to about 15 p.s.i.g., typically 8 p.s.i.g., and at a temperature of 160–220° F., typically 185° F., for a period of time sufficient to cause all of the solubilized vanadium and uranium values to go into solution. Some water vapor is removed from the Pachuca tanks via line 25. The resulting slurry of leached pulp and pregnant liquor is then passed via line 26 to the first of a plurality of vacuum drum filters 27, 28, and 29, operated in series, where said slurry is filtered to separate pregnant liquor containing the soluble vanadium and uranium values, this pregnant liquor being recovered as filtrate via line 30 from the first filter 27. Some of this pregnant liquor can be recycled via line 31 together with mill solution.

The filter cake from the first filter 27 is passed via line 32 to a first repulper 33 and the resulting repulped slurry passed via line 34 to the second filter 28. The filtrate resulting from the second filtration step comprises aqueous alkaline sodium carbonate-bicarbonate mill solution and it is recycled via line 35 to mixer 2, quench tank 9 and ball mill 13. The filter cake from filter 28 is then passed via line 36 to a second repulper 37, and the resulting repulped slurry passed via line 38 to the third filter 29. The filter cake on filter 29 is washed with water supplied via line 39 and then this filter cake is removed from the filter and passed via line 41 as tailings to disposal. The filtrate from this last filtration step is recycled via lines 42, 43 for use in the first repulper 33 and via lines 42, 44 for washing the filter cake in filter 27. The filter cake on filter 28 is washed with barren liquor supplied via line 46 and further barren liquor is supplied via line 47 to second repulper 37, preparation of this barren liquor being subsequently described. Further water can be added to repulper 37 via line 48.

Alternatively, instead of washing the cake on filter 28 with barren liquor, water can be used, or some of the filtrate in line 42 can be used as wash solution. In a further modification, the wash solution used to wash the cake on filter 28 can consist of all of the filtrate in line 42, in which case the cake on filter 27 can be washed with barren liquor plus some of the mill solution withdrawn as filtrate from filter 28.

Since a significant amount of water in the system has been removed as vapor during the roast operation, it is possible according to my invention to utilize increased amounts of water as wash solution to wash the leached pulp or cake on one or more of the filters. As a result, the amounts of soluble vanadium and/or uranium values (and active sodium ion), normally discarded along with the tailings are significantly minimized or reduced. This increases the overall efficiency and economic return of the process. Further, by using the mill solution as a source of active sodium ion to solubilize vanadium values in the roasting operation, rather than supplying all of this sodium ion in the form of dry sodium salt, the concentration of sodium ion in the system will not build up or pyramid or require bleeding solution containing sodium ion from the system. This further adds to the efficiency and economics of the process.

The pregnant liquor in line 30 is preferably passed through a precoated drum filter 51 where it is clarified. The resulting clarified pregnant liquor is then passed via line 52 to a precipitation tank 53 where the soluble uranium values are precipitated by the addition of caustic or aqueous sodium hydroxide via line 54. In this precipitation step, some of the soluble vanadates may also be precipitated as sodium vanadate. The resulting precipitate-containing solution or slurry is then passed via line 56 to a thickener 57. Overflow from thickener 57 is withdrawn therefrom via line 58. Some of this overflow, containing solubilized vanadium values, is passed via line 59 to a vanadium recovery zone 60, and some is passed via line 61 to a recarbonation tank or tower 62 where it is recarbonated by passing carbon dioxide through it, using for example flue gas supplied via line 63. The recarbonated barren liquor is then recycled via line 65 for use in the above-described filtration operation. The thickened slurry containing the precipitate is then passed via line 66 to a vacuum drum filter 67 where it is washed with water via line 68. The resulting yellow cake product is then recovered via line 69. Filtrate from filter 67 can be recycled via line 70 to thickener 57.

The yellow cake product can be further processed by drying and packaging the same according to well-known procedures. However, if the yellow cake product contains a significant amount of vanadium values, e.g., 2 to 7 weight percent of the $U_3O_8$ content, it can be subjected to further processing for the purification of the product and the removal of a significant amount of the vanadium content. For example, the yellow cake product can be subjected to a further roasting operation such as disclosed in copending application Serial No. 72,010, filed November 28, 1960, now Patent Number 3,156,525, by Harold L. Ford et al.

The overflow passed to the vanadium recovery zone 60 can be treated by conventional procedures to recover the vanadium values. For example, this filtrate can be acidified to a pH of 1.5 and heated to precipitate the solubilized vanadium values as red cake, sodium hexametavanadate, $Na_2H_2V_6O_{17}$. Separation of the latter and the melting of this residue, which results in driving off one molecule of water, results in the production of black cake, sodium pyrohexavanadate, $Na_2V_6O_{16}$, a valuable vanadium product. This vanadium product is recovered via line 71, and barren liquor from this recovery operation can be recycled via line 72 to recarbonation tank 62.

The mill solution used during the roasting of the ore according to this invention comprises an aqueous alkaline solution of soluble sodium salts such as sodium carbonate and/or sodium bicarbonate. A typical mill solution which can be used comprises about 4–5 weight percent $Na_2CO_3$, about 8–12 weight percent $Na_2SO_4$, and about 1–1.5 weight percent $NaHCO_3$. Generally, the amount of mill solution used in the roasting operation will contain sufficient $Na^+$ to solubilize a significant amount of the vanadium values present in the ore. In most cases about 25 to 100 pounds of sodium values per ton of ore will be sufficient to extract a significant amount of vanadium. In some cases, additional amounts of salts supplying $Na^+$ can be added to the mill solution to increase the amount of sodium necessary to obtain a satisfactory extraction of vanadium values. Such sodium salts include sodium carbonate, sodium chloride, sodium nitrate, sodium sulfate, and the like.

As an example of the subject invention, the material balance set forth in the table below is presented.

*Material balance*

| Material | Stream | | | | | | | | | | | | | | |
|---|---|---|---|---|---|---|---|---|---|---|---|---|---|---|---|
| | 1 | 3 | 4 | 7 | 8 | 10 | 11 | 12 | 14 | 15 | 21 | 17 | 18 | 22 | 26 |
| Ore, tons/day | 1,000 | | 1,000 | a 5 | 995 | | | 995 | | 3,480 | | 2,485 | 995 | 995 | 992 |
| Solution, tons/day | | 540 | 540 | b 440 | c 100 | 100 | b 85 | 115 | 980 | 4,970 | 3,000 | 625 | 4,345 | 1,095 | 995 |
| $U_3O_8$, lbs./day | 3,070 | 995 | 4,065 | | 4,065 | 185 | | 4,250 | 1,811 | 38,821 | 20,460 | 8,160 | 30,661 | 6,061 | 6,061 |
| $V_2O_5$, lbs./day | 2,053 | 2,840 | 4,893 | | 4,893 | 525 | | 5,418 | 5,132 | 47,350 | 28,340 | 6,300 | 41,250 | 10,550 | 10,550 |

*Material balance*—Continued

| Material | Stream | | | | | | | | | | | | | | |
|---|---|---|---|---|---|---|---|---|---|---|---|---|---|---|---|
| | 20 | 31 | 30 | 32 | 34 | 35 | 36 | 38 | 39 | 41 | 42 | 43 | 44 | 46 | 47 | 52 |
| Ore, tons/day | | | | 992 | 992 | | 992 | 992 | | 992 | | | | | | |
| Solution, tons/day | 250 | 483 | 570 | 282 | 1,062 | 1,137 | 282 | 1,062 | 340 | 282 | 1,120 | 780 | 340 | 357 | 213 | 570 |
| U₃O₈, lbs./day | 1,440 | 2,540 | 3,000 | 589 | 745 | 451 | 351 | 385 | | 161 | 224 | 156 | 68 | 57 | 34 | 3,000 |
| V₂O₅, lbs./day | 2,360 | 4,440 | 5,346 | 1,419 | 2,919 | 4,057 | 1,162 | 2,532 | | 377 | 2,936 | 1,500 | 655 | 2,300 | 1,370 | 5,346 |

| Material | Stream | | | | | | | | | | | | | | |
|---|---|---|---|---|---|---|---|---|---|---|---|---|---|---|---|
| | 54 | 56 | 61 | 63 | 65 | 66 | 68 | 69 | 70 | 59 | 72 | 48 | 25 | 64 | 58 | 71 |
| Solution, tons/day | 8 | 578 | 569 | 4 | 570 | 10 | 1 | 1 | 10 | 260 | 251 | 567 | 100 | 3 | 578 | 9 |
| U₃O₈, lbs./day | | 3,000 | 91 | | 91 | 2,911 | | 2,909 | 2 | 41 | 41 | | | | 91 | trace |
| V₂O₅, lbs./day | | 5,346 | 3,670 | | 3,670 | 114 | | 56 | 64 | 2,370 | 750 | | | | 5,290 | 1,620 |

ᵃ Ore dust and/or SO₂, etc.   ᵇ Water vapor.   ᶜ Dry salts.

Various modifications and laterations of this invention will become apparent to those skilled in the art, without departing from the scope and spirit of this invention, and it should be understood that this invention is not to be limited unduly to that set forth herein for illustrative purposes.

I claim:

1. A method comprising contacting comminuted ore containing vanadium and uranium values with an aqueous alkaline mill solution containing sodium carbonate and sodium bicarbonate, roasting the resulting wetted ore in a roasting zone at elevated temperatures in the range of 1200 to 1700° F., withdrawing vaporized water from said zone, leaching the resulting roasted ore with an aqueous solution containing a soluble sodium salt at temperatures in the range of 160 to 220° F. and at pressures in the range of atmospheric pressure to 15 p.s.i.g., separating the resulting leached pulp and pregnant liquor comprising soluble vanadium and uranium values, washing said leached pulp with a wash solution comprising water, recycling used wash solution for use as said mill solution, and recovering said vanadium values and uranium values from said pregnant liquor.

2. A method comprising contacting comminuted ore containing vanadium and uranium values with an aqueous alkaline mill solution containing sodium carbonate and sodium bicarbonate, roasting the resulting wetted ore in a roasting zone at elevated temperatures in the range of 1200 to 1700° F. to solubilize said vanadium values, withdrawing vaporized water from said zone, cooling, comminuting and classifying the resulting roasted ore, leaching the resulting roasted ore with a leach solution comprising aqueous alkaline sodium carbonate-bicarbonate solution at temperatures in the range of 160 to 220° F. and at pressures in the range of atmospheric pressure to 15 p.s.i.g., filtering the resulting slurry of leached pulp and pregnant liquor comprising soluble vanadium and uranium values, washing said leached pulp with a wash solution comprising water, recycling used washed solution for use as said mill solution, and recovering said vanadium and uranium values from said pregnant liquor.

3. A method comprising mixing comminuted ore containing vanadium and uranium values with an aqueous alkaline mill solution containing sodium carbonate and sodium bicarbonate, roasting the resulting wetted ore in a roasting zone at elevated temperatures in the range of 1200 to 1700° F. to solubilize said vanadium values and vaporize water from said mill solution, withdrawing said vaporized water from said zone, quenching the resulting hot roasted ore with said mill solution, grinding the resulting quenched ore in the presence of said mill solution, classifying the resulting ground ore, leaching the resulting classified ore at elevated temperatures in the range of 160 to 220° F. and at pressures in the range of atmospheric pressure to 15 p.s.i.g. with a leach solution comprising aqueous alkaline sodium carbonate-bicarbonate solution, filtering the resulting slurry of leached pulp and pregnant liquor comprising soluble vanadium and uranium values, washing said leached pulp with water and thereby obtaining a used aqueous alkaline wash solution containing soluble sodium salts, recycling said used wash solution for use as said mill solution, precipitating soluble uranium values from said filtered pregnant liquor, and separating the resulting precipitated uranium values from said soluble vanadium values.

References Cited by the Examiner

UNITED STATES PATENTS

| | | | |
|---|---|---|---|
| 1,054,102 | 2/13 | Fischer | 23—14.5 |
| 1,435,180 | 11/22 | Schlesinger | 23—14.5 |
| 1,438,357 | 12/22 | Bleecker | 23—14.5 |
| 2,217,665 | 10/40 | Brown | 23—14.5 |
| 2,813,003 | 11/57 | Thunaes | 23—14.5 |
| 2,950,951 | 8/60 | Sherk | 23—14.5 |
| 3,022,135 | 2/62 | Hart | 23—14.5 |

OTHER REFERENCES

Butler: "Engineering and Mining Journal," vol. 152, No. 3, March 1951, pp. 56–62.

Marvin et al.: "Proceedings of the International Conference on the Peaceful Uses of Atomic Energy," vol. 8, pp. 3–7, 1956.

Clegg et al.: "Uranium Ore Processing," pp. 103–104, 163, (1958).

CARL D. QUARFORTH, *Primary Examiner.*